United States Patent
Ritter et al.

(10) Patent No.: US 10,067,026 B2
(45) Date of Patent: Sep. 4, 2018

(54) LEAK DETECTION SYSTEM

(71) Applicants: John Albert Ritter, San Clemente, CA (US); Joe Trinh, Rosemead, CA (US); Anthony Alan Grunauer, Mission Viejo, CA (US)

(72) Inventors: John Albert Ritter, San Clemente, CA (US); Joe Trinh, Rosemead, CA (US); Anthony Alan Grunauer, Mission Viejo, CA (US)

(*) Notice: Subject to any disclaimer, the term of this patent is extended or adjusted under 35 U.S.C. 154(b) by 0 days.

(21) Appl. No.: 15/230,287

(22) Filed: Aug. 5, 2016

(65) Prior Publication Data
US 2017/0108398 A1   Apr. 20, 2017

Related U.S. Application Data

(60) Provisional application No. 62/244,031, filed on Oct. 20, 2015.

(51) Int. Cl.
*G01M 3/28*   (2006.01)

(52) U.S. Cl.
CPC .................. *G01M 3/2807* (2013.01)

(58) Field of Classification Search
CPC .. G01M 3/2807; G01M 3/2815; G01M 3/283; G01M 3/2846; G01M 3/2853; G01M 3/26; G01M 3/02; G01M 3/04; G01M 3/28; G01M 3/00; G01M 3/18; F17D 5/02; F17D 5/06; F17D 1/08; F17D 5/04; F17D 5/005
USPC ....... 73/40.5 R, 49.1, 40, 40.7, 49.8; 702/51, 702/45, 36
See application file for complete search history.

(56) References Cited

U.S. PATENT DOCUMENTS

| | | | | |
|---|---|---|---|---|
| 2,400,097 A | * | 5/1946 | Brewer | G01F 1/22 73/861.57 |
| 3,255,922 A | * | 6/1966 | Socol | G01F 1/00 137/429 |
| 3,444,724 A | | 5/1969 | Gilpin | |
| 3,456,500 A | * | 7/1969 | Zaske | F02M 19/01 73/114.44 |
| 3,502,439 A | | 3/1970 | Reece et al. | |
| 4,976,134 A | | 12/1990 | Potvin | |
| 4,984,448 A | * | 1/1991 | Jordan | G01M 3/2815 73/40.5 R |
| 4,998,434 A | | 3/1991 | Asbra | |
| 5,186,058 A | * | 2/1993 | Lew | G01D 5/06 73/861.56 |

(Continued)

OTHER PUBLICATIONS

UEi Test Instruments CD100A Combustible Gas Leak Detector http://www.amazon.com/UEi-Test-Instruments-CD100A-Combustible/dp/B000HHTY7Q.

(Continued)

*Primary Examiner* — Son Le
*Assistant Examiner* — Marrit Eyassu
(74) *Attorney, Agent, or Firm* — John D. Tran; Rhema Law Group

(57) ABSTRACT

A method and apparatus can include: shutting off a gas line at a stop valve; disconnecting a utility meter from a house line; connecting the house line to an output end of a flow meter; connecting the utility meter to an input end of the flow meter; turning the gas line on at the stop valve; and determining: the gas line is leak free based on the flow meter showing no gas flow, and the gas line is leaking based on the flow meter showing a steady gas flow.

18 Claims, 3 Drawing Sheets

(56) References Cited

U.S. PATENT DOCUMENTS

| | | | | |
|---|---|---|---|---|
| 5,269,171 | A | * | 12/1993 | Boyer ................ G01M 3/2807 73/40.5 R |
| 5,412,978 | A | * | 5/1995 | Boone ................ G01M 3/3254 73/40 |
| 5,507,190 | A | * | 4/1996 | Guttmann ................ G01F 1/22 73/861.57 |
| 5,621,164 | A | | 4/1997 | Woodbury |
| 5,827,950 | A | | 10/1998 | Woodbury et al. |
| 5,861,546 | A | | 1/1999 | Sagi et al. |
| RE37,403 | E | | 10/2001 | Howard |
| 6,470,758 | B1 | * | 10/2002 | Bernard .................... G01F 1/22 73/861.51 |
| 6,651,486 | B1 | | 11/2003 | Johnson |
| 7,390,024 | B2 | | 6/2008 | Giordano |
| 7,669,461 | B2 | | 3/2010 | Kates |
| 8,947,242 | B2 | | 2/2015 | Kucera et al. |
| 2006/0248962 | A1 | * | 11/2006 | Vaughn .................... G01F 1/22 73/861.57 |
| 2009/0187356 | A1 | * | 7/2009 | Artiuch ............... G01F 25/0053 702/45 |
| 2012/0247189 | A1 | * | 10/2012 | Finlay .................... G01M 3/007 73/40.5 A |

OTHER PUBLICATIONS

Home Depot, Gas Leak Detector for Natural, Liquid Propane, Butane and Methane Gas Detection http://www.homedepot.com/p/BrassCraft-Gas-Leak-Detector-for-Natural-Liquid-Propane-Butane-and-Methane-Gas-Detection-BCGLD01-X6/202800802.

Agilent, Flow Meters and Leak Detection http://www.agilent.com/store/en_US/Cat-SubCat1ECS_30158/Flow-Meters-and-Leak-Detection.

Alde gas leak detectors; http://www.alde.co.uk/itemdetails.php?itemId=53.

Dwyer Portable Ultrasonic Flowmeter Detectors www.dwyer-inst.com/Product/Flow/Flowmeters/Ultrasonic/SeriesPSX2.

Yokogawa http://www.rotameter-shop.de/rotameter-grundlagen/rotameter-messprinzip.html/.

Omega http://www.omega.com/pptst/FLT.html.

Ionscience http://www.ionscience.com/products/sf6-leakcheck-p1p-transportable-sf6-leak-detection; http://www.ionscience.com/products/gascheck-g-handheld-gas-leak-detector.

Supelco https://www.sigmaaldrich.com/content/dam/sigma-aldrich/docs/Supelco/Bulletin/t196898.pdf.

* cited by examiner

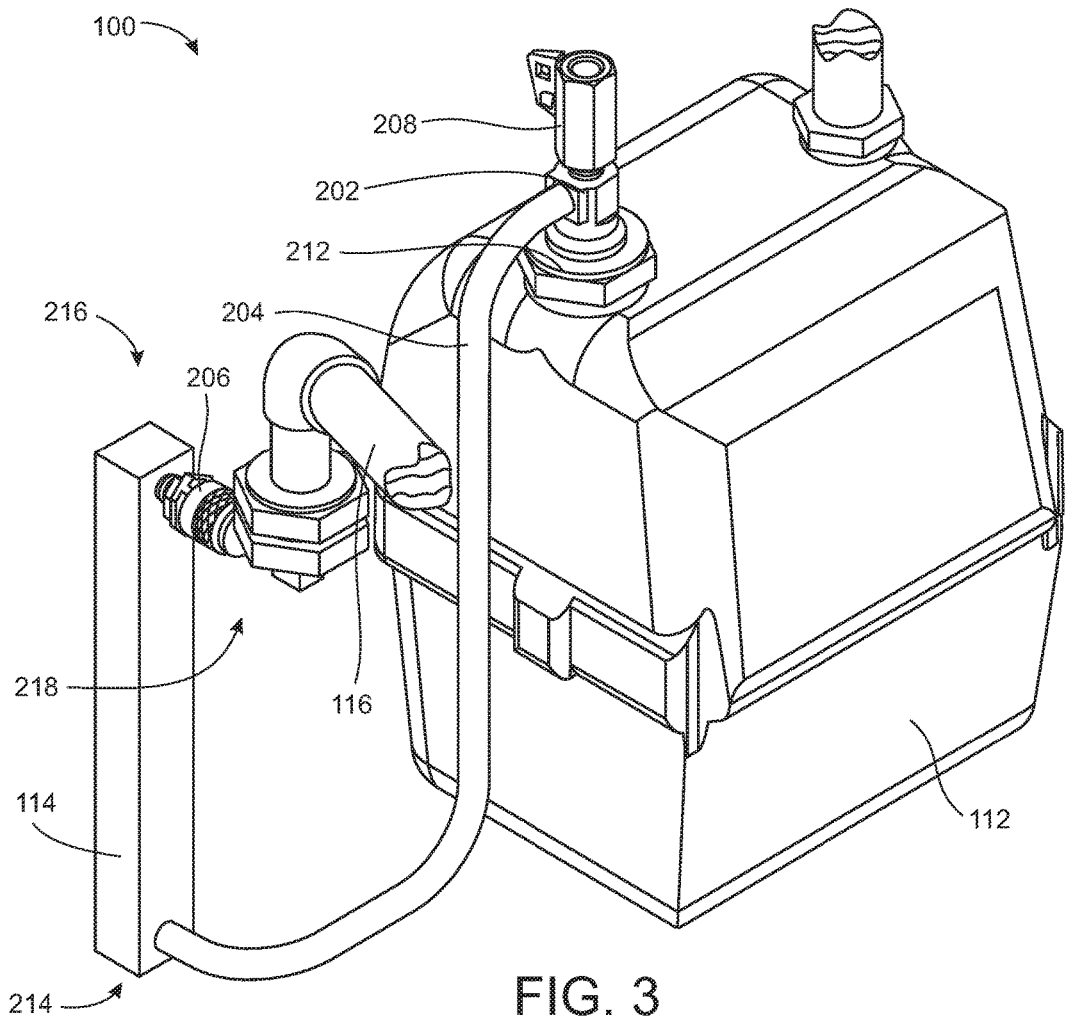
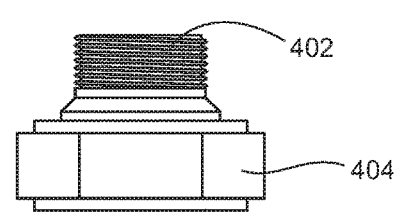
FIG. 4
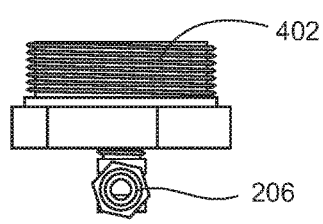
FIG. 5

LEAK DETECTION SYSTEM

CROSS-REFERENCE TO RELATED APPLICATIONS

This claims priority benefit to all common subject matter of U.S. Provisional Patent Application 62/244,031 filed Oct. 20, 2015. The content of this application is incorporated herein by reference in its entirety.

TECHNICAL FIELD

This disclosure relates to leak detection, more particularly leak detection utilizing a flow rate meter.

BACKGROUND

Combustible gasses are commonly used within many structures including industrial or manufacturing settings, residential buildings, and office buildings. Combustible gasses present unique challenges and can present immense danger when not contained properly.

Combustible gas leaks can present immediate danger to human life and structures. These dangers can arise from oxygen displacement, fire potential, or explosive potential.

Many prior developments have been advanced to detect gas leaks. These previous developments provide only partial solutions and present multiple disadvantages including being highly localized, expensive to implement and produce, being complicated, being prone to failure and miscalibration, and are generally only able to detect specific kinds or families of gasses.

One previous development includes catalytic detectors that utilize a reference and active coils. The active coil can be embedded within a catalyst. An exothermic reaction with combustible gases and oxygen can take place on the surface of the catalyst. In the presence of some combustible gases a temperature difference can be generated which is proportional to the gas concentration.

While catalytic detectors are generally considered to be robust, these detectors are highly localized and vulnerable to "poisoning" where the catalyst can become inactive due to contamination from chlorinated and silicon compounds. Detecting this sensitivity loss requires regular checking and calibration.

Another shortcoming of catalytic detectors is that catalytic detectors require the presence of oxygen. Even further, prolonged exposure to combustible gases can degrade the catalytic detector's performance and when flooded with high concentrations, the catalytic detectors may provide a low to no response.

Another previous development includes infrared detectors which detect the absorption of infrared radiation at various wavelengths as it passes through gas. Infrared detectors detect the difference between two infrared light beams, one beam passing through a reference cell the other passing through a sample cell.

While infrared do overcome some problems inherent to catalytic detectors like poisoning, Infrared detectors are also highly localized and provide only a partial solution to detecting gas leaks. Infrared detectors rely on absorption by a sample gas, and some hydrocarbons and other flammable gasses have very low absorption properties so are largely invisible to infrared detectors.

Infrared detectors also occupy a higher price point per detector with higher spare part costs, which can present challenges fielding infrared detectors over a large structure. Infrared detectors are also sensitive to high humidity and dust which increases maintenance costs and frequency. Infrared detectors also have a limited temperature range within which they can effectively operate and performance can be impaired when multiple gasses are present.

Solutions have been long sought but prior developments have not taught or suggested any complete solutions, and solutions to these problems have long eluded those skilled in the art. Thus there remains a considerable need for devices and methods that can provide a simple, robust, effective solution for gas detection that can operate without large maintenance requirements over a large general locality at an affordable price point.

SUMMARY

A leak detection system and methods, providing a simple, robust, effective solution for gas detection that can operate without large maintenance requirements over a large general locality at an affordable price point, are disclosed. The leak detection system and methods can include: shutting off a gas line at a stop valve; disconnecting a utility meter from a house line; connecting the house line to an output end of a flow meter; connecting the utility meter to an input end of the flow meter; turning the gas line on at the stop valve; and determining: the gas line is leak free based on the flow meter showing no gas flow, and the gas line is leaking based on the flow meter showing a steady gas flow.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The leak detection system is illustrated in the figures of the accompanying drawings which are meant to be exemplary and not limiting, in which like reference numerals are intended to refer to like components, and in which:

FIG. 3 is an isometric view of the leak detection system of FIG. 1.
FIG. 4 is a front side view of the manifold adapter of FIG. 2.
FIG. 5 is a front view of the house line adapter of FIG. 2.

DETAILED DESCRIPTION

Figure 1:
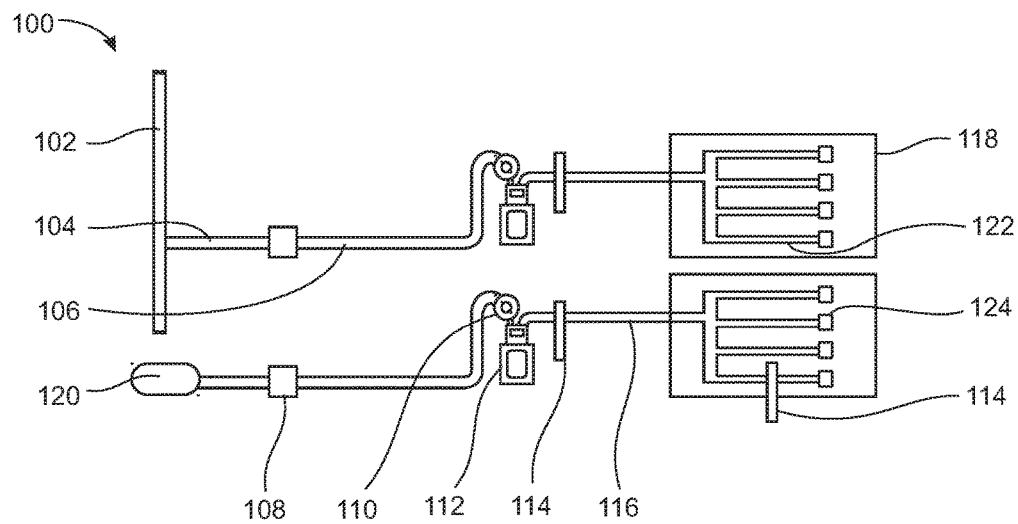
FIG. 1 is a diagrammatic view of a leak detection system.

In the following description, reference is made to the accompanying drawings that form a part hereof, and in which are shown by way of illustration, embodiments in which the leak detection system may be practiced. It is to be understood that other embodiments may be utilized and structural changes may be made without departing from the scope of the leak detection system.

When features, aspects, or embodiments of the leak detection system are described in terms of steps of a process, an operation, a control flow, or a flow chart, it is to be understood that the steps can be combined, performed in a different order, deleted, or include additional steps without departing from the leak detection system as described herein.

The leak detection system is described in sufficient detail to enable those skilled in the art to make and use the leak detection system and provide numerous specific details to give a thorough understanding of the leak detection system; however, it will be apparent that the leak detection system may be practiced without these specific details.

In order to avoid obscuring the leak detection system, some well-known system configurations are not disclosed in detail. Likewise, the drawings showing embodiments of the system are semi-diagrammatic and not to scale and, particularly, some of the dimensions are for the clarity of presentation and are shown greatly exaggerated in the drawing FIGs. Generally, the leak detection system can be operated in any orientation.

Referring now to FIG. 1, therein is shown a diagrammatic view of a leak detection system 100. The leak detection system 100 is shown to include a main line 102, which can serve as a main distribution channel for gas.

The main line 102 can be coupled to distribution service lines 104. The distribution service lines 104 can tee off from the main line 102.

The distribution service lines 104 can be coupled to consumer service lines 106 with stop valves 108 in between the consumer service lines 106 and the distribution service lines 104. The stop valves 108 can be used to turn the gasses from the main line 102 off enabling the consumer service lines 106 to be depressurized.

When the stop valves 108 are open, the consumer service lines 106 and the distribution service lines 104 can be at the same pressure. In other contemplated embodiments, a regulator can be included between the distribution service lines 104 and the consumer service lines 106 and can provide a lower pressure between the distribution service lines 104 and the consumer service lines 106.

The consumer service lines 106 can be coupled to regulators 110. The consumer service lines 106 are depicted between the stop valves 108 and the regulators 110. The regulators 110 can be coupled to utility meters 112.

The regulators 110 and the utility meters 112 together can step the pressure of the gasses from the main line 102 down and measure the amount of gas used downstream of the utility meters 112. The utility meters 112 can be coupled to flow meters 114.

The flow meters 114 can be coupled on one side to the utility meters 112 and coupled on the other side to house lines 116. The house lines 116 can transport the gasses into structures 118. The structures 118 can include residential houses, factories, restaurants, hotels, hospitals, and offices.

It is contemplated that some implementations of the leak detection system 100 will not be connected or employ the main line 102. For example, when a local gas storage tank 120 is used for site specific gasses.

Within the structures 118, the house lines 116 can tee off into internal gas lines 122. The internal gas lines 122 can terminate in gas elements 124.

The gas elements 124 can include appliances such as cooking surfaces or heaters. The gas elements 124 can further include process equipment or even other tanks.

The gas elements 124 are contemplated to be terminal elements and can seal the gasses within the gas elements 124 themselves, within the house lines 116 and within the internal gas lines 122. When the gasses within the house lines 116, the internal gas lines 122, or the gas elements 124 do not seal the gasses a leak will be present.

The flow meters 114 are further coupled onto the internal gas lines 122 or between the internal gas lines 122 and the gas elements 124. It has been discovered that positioning the flow meters 114 between the house lines 116 and the utility meters 112 allows the entire structure to be checked while locating the flow meters 114 along the internal gas lines 122 or near the gas elements 124 allows more localized leak detection. For descriptive clarity, the following FIGS. 2-5 will describe the flow meter 114 placed between the utility meter 112 and the house line 116.

Figure 2:
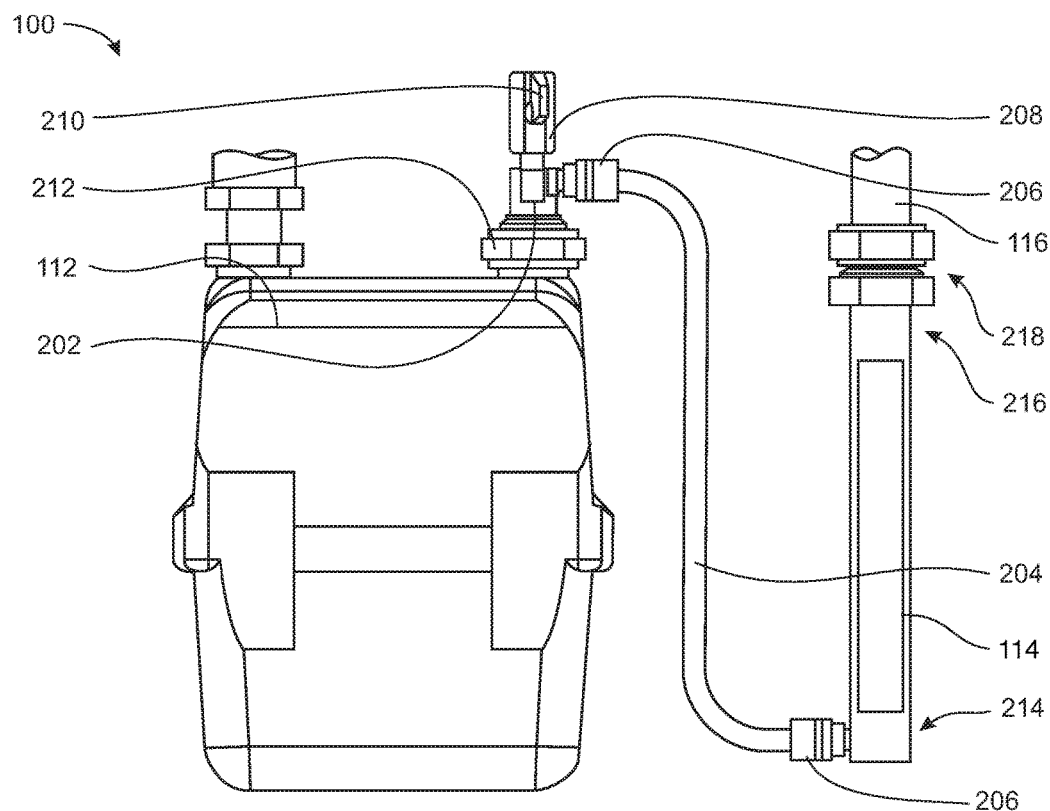
FIG. 2 is a front side view of the leak detection system of FIG. 1.

Referring now to FIG. 2, therein is shown a front side view of the leak detection system 100 of FIG. 1. The leak detection system 100 is depicted having one of the flow meters 114 coupled to a manifold 202 with a hose 204.

The hose 204 can be coupled to the manifold 202 and to the flow meter 114 with connectors 206. The connectors 206 are contemplated to be quick connect fittings, threaded connections, or flanged connections.

For example, it is contemplated that the hose 204 can be connected to the manifold 202 using quick connect fittings while the hose 204 can be connected to the flow meter 114 with a threaded connection. It has been discovered that implementing a threaded connection between the flow meter 114 and the hose 204 and a quick connection fitting between the manifold 202 and the hose 204 enables easy storage of the leak detection system 100 while simultaneously enabling fast secure installation, which results from the manifold 202 being a separate and easily manipulatable component that can be installed independently of the hose 204 and the manifold 202.

The manifold 202 can further be coupled to a manifold valve 208. The manifold valve 208 can be seen coupled to the top of the manifold 202 and can extend upward from the manifold 202.

The manifold valve 208 is depicted as a quarter turn valve with a valve handle 210 on the front side; however, it is contemplated that the manifold valve 208 can be other types of valves. The manifold valve 208 can be used to control the gases within the system and shut off gas flow past, or downstream from, the manifold 202.

The manifold 202 can be coupled to one of the utility meters 112 with a manifold adapter 212. The manifold adapter 212 can be a separate connector that can be sized and configured for different individual utility meters 112.

The hose 204 can be connected to an input end 214 of the flow meter 114 while one of the house lines 116 can be connected to an output end 216 of the flow meter 114. The output end 216 of the flow meter 114 can be connected to the house line 116 with a house line adapter 218. It is contemplated that the manifold adapter 212 and the house line adapter 218 can be sized for example to be compatible with the ANSI B109 family of standards including: 5LT, 10LT, 1A/#1, 1PITTS, 20LT, #2 SPRAGUE, 30LT, 45LT, #3/#4 SPRAGUE, 60LT, 100LT, and #5 SPRAGUE.

Referring now to FIG. 3, therein is shown an isometric view of the leak detection system 100 of FIG. 1. The utility meter 112 is shown coupled to the manifold 202 with the manifold adapter 212 while the manifold valve 208 is depicted extending upward from and coupled to the manifold 202.

The manifold 202 is further shown coupled to the hose 204. The hose 204 is depicted extending down from the manifold 202 to couple with the input end 214 of the flow meter 114.

The output end 216 of the flow meter 114 is shown coupled to the house line 116 with the house line adapter 218. The house line adapter 218 can be coupled to the house line 116 with one of the threaded connections, while the house line adapter 218 is depicted having the connector 206 directly coupled to the flow meter 114. The connector 206 of the house line adapter 218 that is directly coupled to the flow meter 114 is depicted as a quick connect fitting; however it is contemplated that some embodiments could use bared fittings for the connector 206.

Referring now to FIG. 4, therein is shown a front side view of the manifold adapter 212 of FIG. 2. The manifold adapter 212 is depicted having the threaded connections on both ends of the manifold adapter 212.

The threaded connections on the top portion of the manifold adapter 212 are depicted as a male threaded connection 402 while the threaded connections on the bottom portion of the manifold adapter 212 are depicted as a female threaded connection 404.

Referring now to FIG. 5, therein is shown a front view of the house line adapter 218 of FIG. 2. The house line adapter 218 is depicted having the male threaded connections 402 on a top portion of the house line adapter 218. The house line adapter 218 is shown having the connector 206 on a bottom portion of the house line adapter 218. The connector 206 is depicted as the quick connect fitting.

Figure 6:
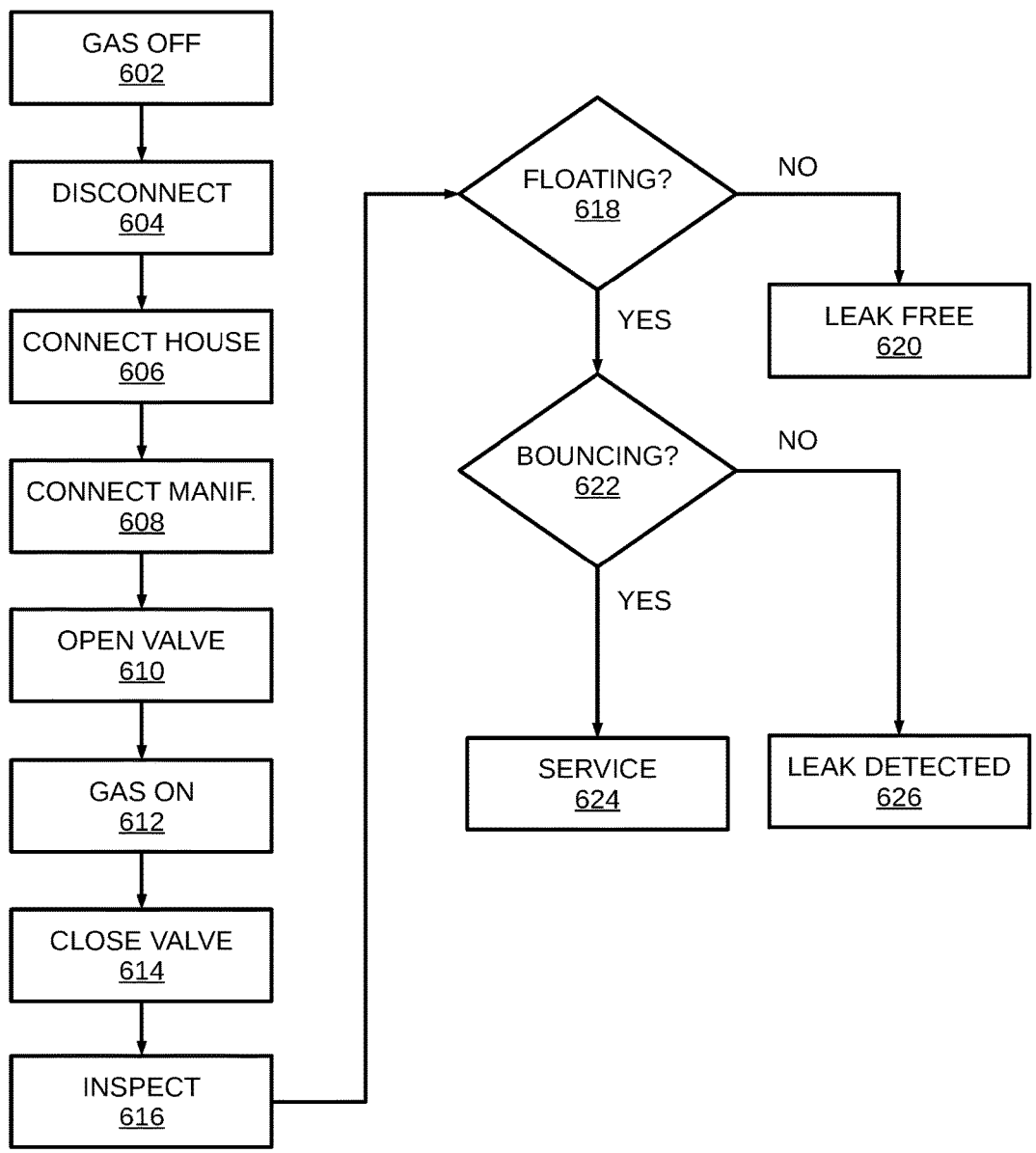
FIG. 6 is a flow chart for a method of operating the leak detection system of FIG. 1.

Referring now to FIG. 6, therein is shown a flow chart for a method of operating the leak detection system 100 of FIG. 1. The method of operating the leak detection system 100 includes multiple steps. It is contemplated that the steps can be combined, or replaced without deviating from the method of operating the leak detection system 100.

The method of operating the leak detection system 100 can begin with a gas off step 602. The gas off step 602 can include turning the stop valves 108 of FIG. 1 off. The gas off step 602 can also include shutting the gas off from the main line 102 of FIG. 1 or the local gas storage tank 120 of FIG. 1 with a valve that is upstream from the utility meters 112 of FIG. 1.

It is further contemplated that when the flow meter 114 of FIG. 1 is placed along the internal gas lines 122 of FIG. 1 or near the gas elements 124 of FIG. 1, the gas off step 602 can include shutting off the gas with a valve downstream from the utility meters 112.

Continuing with the example of FIGS. 2-5, where the flow meter 114 is placed between the utility meter 112 and the house line 116, the method of operation can proceed from the gas off step 602 to a disconnect step 604. The disconnect step 604 can include disconnecting house line 116 from the utility meter 112.

Once the house line 116 has been disconnected, it is contemplated that the house line 116 could be rotated away from the utility meters 112 leaving a space between the terminal end of the house line 116 and the utility meter 112. After the utility meter 112 is disconnected from the house line 116 and the house line 116 rotated away from the utility meter 112, a connect house line step 606 can be performed.

The connect house line step 606 can include connecting the house line 116 to the house line adapter 218 of FIG. 2 and can include connecting the house line adapter 218 to the output end 216 of the flow meter 114. After the house line 116 is connected to the flow meter 114 through the house line adapter 218, a connect manifold step 608 can be performed.

The connect manifold step 608 can include connecting the manifold adapter 212 of FIG. 2 to the utility meter 112 and connecting the hose 204 of FIG. 2 to the manifold adapter 212. Thus after performing both the connect manifold step 608 and the connect house line step 606 the flow meter 114 will be connected as is depicted FIG. 2 between the utility meter 112 and the house line 116.

It is contemplated that the connect house line step 606 and connect manifold step 608 could be performed in reverse order. Once the connect house line step 606 and connect manifold step 608 have been performed an open valve step 610 can be performed.

The open valve step 610 can include opening the manifold valve 208 of FIG. 2 coupled to the manifold 202, which can allow gas to flow through the manifold valve 208, the manifold 202 the hose 204, the flow meter 114, and ultimately into the house line 116. It is contemplated that the open valve step 610 can be performed before, during, or after the connect manifold step 608.

Once the connect manifold step 608 and the connect house line step 606 have been performed to connect the flow meter 114 between the utility meter 112 and the house line 116 as depicted in FIGS. 2 and 3 and once the open valve step 610 has been performed to open the manifold valve 208, a gas on step 612 can be performed. The gas on step 612 can include opening the stop valves 108 shut off during the gas off step 602. It is further contemplated that the gas on step 612 can include turning all valves shut off during the gas off step 602.

During the gas on step 612, the leak detection system 100 will pressurize with the gas during the gas on step 612. Once the leak detection system 100 is pressurized during the gas on step 612, a close valve step 614 can be performed.

During the close valve step 614, the manifold valve 208 can be closed. Closing the manifold valve 208 will prevent more gas flowing downstream from the utility meter 112. Once the close valve step 614 has been performed an inspection step 616 can be performed.

During the inspection step 616, the flow meter 114 can be watched. In the implementation of the leak detection system 100 where the flow meter 114 is implemented as a rotameter, a float within the flow meter 114 can be inspected during the inspection step 616.

The following steps will be described with regard to the flow meter 114 implemented as a rotameter, however it is contemplated that the steps can be performed when the flow meter 114 is implemented in other types of flow meters. A floating decision step 618 can be used to determine whether a float of the flow meter 114 is floating. If the float is determined not to be floating, which indicates that no gas is flowing through the flow meter 114, the leak detection system 100 can be determined to be leak free 620.

If the float is determined to be floating, a bouncing decision step 622 can be used to determine whether the float of the flow meter 114 is bouncing. If the float of the flow meter 114 is bouncing a service step 624 can be performed. If the float of the flow meter 114 is not bouncing, the service step 624 is not performed.

During the service step 624, the flow meter 114 should be serviced. If the float is not determined to be bouncing in the bouncing decision step 622 and the float is determined to be floating in the floating decision step 618, which indicates that gas is flowing through the flow meter 114, the leak detection system 100 can be determined to have a leak 626.

Thus, it has been discovered that the leak detection system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the leak detection system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A method of operating a leak detection system comprising:
    shutting off a gas line at a stop valve;
    disconnecting a utility meter from a house line;
    connecting the house line to an output end of a flow meter;
    connecting the utility meter to an input end of the flow meter;
    turning the gas line on at the stop valve; and
    determining:
        the flow meter needs servicing based on a float of the flow meter showing inconsistent gas flow by bouncing and the flow meter does not need servicing based on the float of the flow meter not bouncing,
        the gas line is leak free based on the flow meter showing no gas flow, and
        the gas line is leaking based on the flow meter showing a steady gas flow.

2. The method of claim 1 wherein connecting the house line to the flow meter includes connecting a house line adapter between the house line and the flow meter.

3. The method of claim 1 wherein connecting the utility meter to the flow meter includes connecting a hose between the input end of the flow meter and the utility meter.

4. The method of claim 1 wherein connecting the utility meter to the flow meter includes connecting a manifold between the input end of the flow meter and the utility meter.

5. A method of operating a leak detection system comprising:
    shutting off a gas line at a stop valve;
    disconnecting a utility meter from a house line;
    connecting the house line to an output end of a flow meter;
    connecting a manifold to the utility meter, the manifold including a manifold valve;
    connecting the manifold to an input end of the flow meter;
    opening the manifold valve;
    turning the gas line on at the stop valve;
    closing the manifold valve; and
    determining:
        the flow meter needs servicing based on a float of the flow meter showing inconsistent gas flow by bouncing and the flow meter does not need servicing based on the float of the flow meter not bouncing,
        the gas line is leak free based on the flow meter showing no gas flow, and
        the gas line is leaking based on the flow meter showing a steady gas flow.

6. The method of claim 5 wherein connecting the manifold including a manifold valve includes connecting the manifold having a quarter turn manifold valve.

7. The method of claim 5 wherein connecting the flow meter to the manifold includes connecting a hose between the manifold and the flow meter.

8. The method of claim 7 wherein connecting the flow meter to the manifold includes:
    connecting the hose to the manifold with a quick disconnect connector; and
    connecting the hose to the input end of the flow meter with a threaded connection.

9. The method of claim 5 wherein connecting the manifold to the utility meter includes connecting a manifold adapter between the manifold and the utility meter.

10. A leak detection system comprising:
    a stop valve configured to shut off a gas line;
    a utility meter connected to the stop valve;
    a house line configured to be disconnected from the utility meter;
    a flow meter having an input end and an output end, the output end of the flow meter configured to be connected to the house line, and the input end of the flow meter configured to be connected to the utility meter;
    wherein the flow meter is configured to determine:
        the flow meter needs servicing based on a float of the flow meter showing inconsistent gas flow by bouncing and the flow meter does not need servicing based on the float of the flow meter not bouncing,
        the gas line is leak free based on the flow meter showing no gas flow, and
        the gas line is leaking based on the flow meter showing a steady gas flow.

11. The system of claim 10 further comprising a house line adapter connected between the house line and the flow meter.

12. The system of claim 10 further comprising a hose connected between the input end of the flow meter and the utility meter.

13. The system of claim 10 further comprising a manifold connected between the input end of the flow meter and the utility meter.

14. The system of claim 13 wherein the manifold includes a manifold including a manifold valve, the manifold valve configured to turn on for pressurizing the gas line.

15. The system of claim 14 wherein the manifold valve is a quarter turn manifold valve.

16. The system of claim 14 further comprising a hose connected between the flow meter and the manifold.

17. The system of claim 16 further comprising:
    a quick disconnect connector connecting the hose to the manifold; and
    a threaded connection connecting the hose to the input end of the flow meter.

18. The system of claim 14 further comprising a manifold adapter connecting the manifold to the utility meter.

* * * * *